United States Patent
Imasaka et al.

(10) Patent No.: US 12,552,937 B2
(45) Date of Patent: Feb. 17, 2026

(54) ORGANOPOLYSILOXANE COMPOUND AND PRODUCTION METHOD THEREOF, AND COMPOSITION CONTAINING SAID COMPOUND

(71) Applicant: Shin-Etsu Chemical Co., Ltd., Tokyo (JP)

(72) Inventors: Yudai Imasaka, Annaka (JP); Taiki Katayama, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 867 days.

(21) Appl. No.: 17/779,001

(22) PCT Filed: Dec. 7, 2020

(86) PCT No.: PCT/JP2020/045378
§ 371 (c)(1),
(2) Date: May 23, 2022

(87) PCT Pub. No.: WO2021/117652
PCT Pub. Date: Jun. 17, 2021

(65) Prior Publication Data
US 2023/0017437 A1    Jan. 19, 2023

(30) Foreign Application Priority Data
Dec. 11, 2019    (JP) .................................. 2019-223770

(51) Int. Cl.
| | | |
|---|---|---|
| C08L 83/06 | (2006.01) | |
| C08G 77/18 | (2006.01) | |
| C09D 183/04 | (2006.01) | |
| C09J 183/04 | (2006.01) | |
| C09K 3/10 | (2006.01) | |

(52) U.S. Cl.
CPC ............. *C08L 83/06* (2013.01); *C08G 77/18* (2013.01); *C09D 183/04* (2013.01); *C09J 183/04* (2013.01); *C09K 3/1018* (2013.01); *C09K 2200/0685* (2013.01)

(58) Field of Classification Search
None
See application file for complete search history.

(56) References Cited

U.S. PATENT DOCUMENTS

| | | |
|---|---|---|
| 3,494,950 A | 2/1970 | Simmler et al. |
| 5,895,711 A | 4/1999 | Yamaki et al. |
| 6,756,425 B2 | 6/2004 | Mogi et al. |
| 9,644,124 B2 | 5/2017 | Sakamoto et al. |
| 2008/0064813 A1* | 3/2008 | Schneider ............... C08K 5/54 524/837 |
| 2018/0009953 A1 | 1/2018 | Lu et al. |

FOREIGN PATENT DOCUMENTS

| | | |
|---|---|---|
| EP | 2 937 352 B1 | 7/2019 |
| EP | 3 751 048 A1 | 12/2020 |
| JP | 2-206654 A | 8/1990 |
| JP | 10-142987 A | 5/1998 |
| JP | 2003-147203 A | 5/2003 |
| JP | 2012-140700 A | 7/2012 |
| JP | 2016-60723 A | 4/2016 |
| JP | 5997778 B2 | 9/2016 |
| JP | 2018-514599 A | 6/2018 |
| JP | 2019-137929 A | 8/2019 |

OTHER PUBLICATIONS

Freidrich et. al., Colloid Journal and Journal of Polymers, vol. 218, Issue 1 (Year: 1967).*
Freidrich et. al., Colloid Journal and Journal of Polymers, 1967, vol. 218, Issue 1 (English Machine Translation) (Year: None).*

(Continued)

*Primary Examiner* — Randy P Gulakowski
*Assistant Examiner* — Holley Grace Hester
(74) *Attorney, Agent, or Firm* — Birch, Stewart, Kolasch & Birch, LLP

(57) ABSTRACT

Provided is an organopolysiloxane compound acting as a chain extender for use in a room-temperature-vulcanizing (RTV) composition of a dealcoholization type that can be rapidly turned into a rubber and then exhibit a rubber elasticity. The organopolysiloxane compound is represented by the following general formula (1), and also provided is a composition containing this compound and a linear diorganopolysiloxane with both molecular chain ends being blocked by a silanol group or a hydrolyzable silyl group,

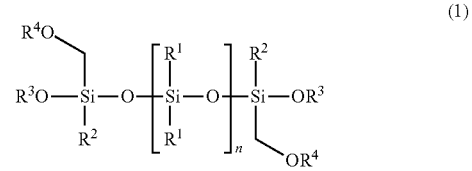

(1)

wherein each of $R^1$, $R^2$, $R^3$ and $R^4$ independently represents a substituted or unsubstituted alkyl group having 1 to 10 carbon atoms, or a substituted or unsubstituted aryl group having 6 to 10 carbon atoms; and n is a number of 0 to 10.

1 Claim, No Drawings

(56) References Cited

OTHER PUBLICATIONS

International Search Report (PCT/ISA/210) issued in PCT/JP2020/045378, dated Feb. 2, 2021.
Li et al., "Transparent and Durable $SiO_2$-Containing Superhydrophobic Coatings on Glass," J.Appl.Polym. Sci., vol. 132, 2015, total 7 pages.
Written Opinion of the International Searching Authority (PCT/ISA/237) issued in PCT/JP2020/045378, dated Feb. 2, 2021.
Japanese Office Action for Japanese Application No. 2021-563934, dated Apr. 25, 2023, with an English translation.
Extended European Search Report for European Application No. 20899230.5, dated Dec. 7, 2023.

* cited by examiner

ORGANOPOLYSILOXANE COMPOUND AND PRODUCTION METHOD THEREOF, AND COMPOSITION CONTAINING SAID COMPOUND

TECHNICAL FIELD

The present invention relates to, for example, an organopolysiloxane compound, a production method thereof, and a composition containing such compound. Particularly, the present invention relates to, for example, a difunctional hydrolyzable organopolysiloxane compound, a production method thereof, and a composition containing such organopolysiloxane compound. Specifically, this difunctional hydrolyzable organopolysiloxane compound acts as a chain extender in a room temperature-curable organopolysiloxane composition containing, as a main agent (base polymer), a linear diorganopolysiloxane with both molecular chain ends being blocked by a silanol group or a hydrolyzable silyl group such as an alkoxysilyl group. More specifically, this difunctional hydrolyzable organopolysiloxane compound has one methyl group substituted by an organooxy group such as an alkoxy group (α-organooxy-substituted methyl group) on each silicon atom at both ends of the molecular chain (i.e. two such α-organooxy-substituted methyl groups in the molecule), and has one silyl group having only one silicon atom-bonded organooxy group such as a silicon-atom bonded alkoxy group (mono-organooxysilyl group), at each molecular chain end (i.e. two such mono-organooxysilyl groups in the molecule), where these groups at both ends of the molecular chain serve as silicon-containing groups (also referred to as "reactive silicon-containing groups" hereunder) capable of further polymerizing the above base polymer by forming siloxane bonds as a result of undergoing a hydrolysis and condensation reaction with the end silanol group or hydrolyzable silyl group of such base polymer.

BACKGROUND ART

Since a reactive silicon-containing group, especially a hydrolyzable silyl group has a property of undergoing hydrolysis condensation under the presence of water, a polymer(s) having such reactive silicon-containing group can be used in various room temperature-curable resin compositions that are curable by crosslinking under the presence of water in the air or moisture.

As for these polymers, those whose main chains have a silicon-containing structure (particularly preferably, a linear organopolysiloxane structure) are generally known as silicone polymers. A room-temperature-vulcanizing (RTV) organopolysiloxane composition containing such silicone polymer as a main agent (base polymer) has a characteristic of being in a liquid form at room temperature (23° C.±10° C.), and turned into a silicone rubber elastic body (silicone elastomer) when cured (crosslinking reaction); utilizing such characteristic, the composition is thus widely used in coating agents, adhesive agents, architectural sealing agents and the like. A silane coupling agent, a partially hydrolyzed and condensed product thereof and the like are used in such room-temperature-vulcanizing (RTV) organopolysiloxane composition, as a cross-liking agent and a stabilizer. Particularly, even among cross-linking agents, a difunctional silane coupling agent having two hydrolyzable groups in the molecule is called chain extender; by extending the chain length of a silicone polymer, an appropriate extensibility can be imparted to a sealing agent and a RTV rubber cured product.

There are known various types of room-temperature-vulcanizing (RTV) organopolysiloxane compositions. Especially, those of a dealcoholization type that harden by releasing alcohols due to a hydrolysis and condensation reaction at the time of crosslinking, have a characteristic of presenting no unpleasant odors and not corroding metals, and are thus preferably used for sealing, adhesion and coating of electric and electronic devices or the like (Patent documents 1 and 2).

PRIOR ART DOCUMENTS

Patent Documents

Patent document 1: JP-A-2003-147203
Patent document 2: Japanese Patent No. 5997778

SUMMARY OF THE INVENTION

Problems to be Solved by the Invention

However, as compared to conventionally known compositions of other curing types such as a deacetone type, a deoxime type and a deaminoxy type, those of a dealcoholization type have a low reactivity with water (moisture) in the air and thus have a slow curing speed; there has never been an organopolysiloxane compound acting as a chain extender for an industrially practicable room-temperature-vulcanizing (RTV) composition of a dealcoholization type.

Thus, it is an object of the present invention to provide an organopolysiloxane compound acting as a chain extender for an industrially practicable room-temperature-vulcanizing (RTV) organopolysiloxane composition of a dealcoholization type that can be rapidly turned into a rubber and then exhibit a rubber elasticity.

Means to Solve the Problems

The inventors of the present invention diligently conducted a series of studies to achieve the above object, and completed the invention as follows. That is, the inventors found that a particular hydrolyzable organopolysiloxane compound represented by the following general formula (1) is useful in solving the abovementioned problems, where in the formula (1), the silicon atoms at both ends of the molecular chain each have one methyl group substituted by an organooxy group such as an alkoxy group (α-organooxy-substituted methyl group) and one organooxy group such as an alkoxy group (i.e. two at each end in the molecule).

Specifically, the present invention is to provide the following organopolysiloxane compound; a method for producing such compound; a composition containing such compound; a coating agent, adhesive agent and sealing agent comprised of such composition; and an object having a cured product of such composition etc.

[1]

An organopolysiloxane compound represented by the following general formula (1):

[Chemical formula 1]

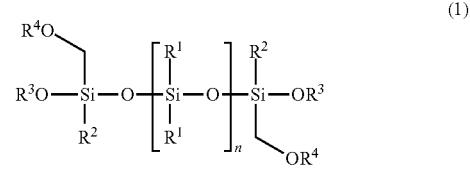

wherein each of $R^1$, $R^2$, $R^3$ and $R^4$ independently represents a substituted or unsubstituted alkyl group having 1 to 10 carbon atoms, or a substituted or unsubstituted aryl group having 6 to 10 carbon atoms; and n is a number of 0 to 10.

[2]
A composition comprising:
the organopolysiloxane compound according to [1]; and
a linear diorganopolysiloxane with both molecular chain ends being blocked by a silanol group or a hydrolyzable silyl group.

[3]
The composition according to [2], wherein the composition is a coating agent composition.

[4]
The composition according to [2], wherein the composition is an adhesive agent composition.

[5]
The composition according to [2], wherein the composition is a sealing agent composition.

[6]
A cured product of the composition according to any one of [2] to [5].

[7]
An object having the cured product according to [6].

[8]
A method for producing an organopolysiloxane compound represented by the following general formula (1)', comprising:
a step of dimerizing an organosilane compound represented by the following general formula (2) via a condensation reaction performed under the presence of a catalyst,

[Chemical formula 2]

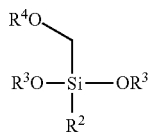

(2)

wherein each of $R^2$, $R^3$ and $R^4$ independently represents a substituted or unsubstituted alkyl group having 1 to 10 carbon atoms, or a substituted or unsubstituted aryl group having 6 to 10 carbon atoms,

[Chemical formula 3]

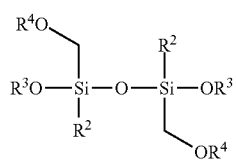

(1)' wherein each of $R^2$, $R^3$ and $R^4$ independently represents a substituted or unsubstituted alkyl group having 1 to 10 carbon atoms, or a substituted or unsubstituted aryl group having 6 to 10 carbon atoms.

[9]
A method for producing an organopolysiloxane compound represented by the following general formula (1)", comprising:

a step of subjecting a diorganopolysiloxane of the following general formula (3) with both molecular chain ends being blocked by a silanol group and an organosilane compound of the following general formula (2) to a condensation reaction, and thus blocking both ends of the molecular chain of the diorganopolysiloxane of the following general formula (3) with both molecular chain ends being blocked by a silanol group with a residue of the organosilane compound of the following general formula (2),

[Chemical formula 4]

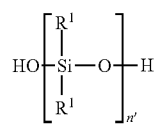

(3)

wherein each $R^1$ independently represents a substituted or unsubstituted alkyl group having 1 to 10 carbon atoms, or a substituted or unsubstituted aryl group having 6 to 10 carbon atoms; and n' is a number of 1 to 10,

[Chemical formula 5]

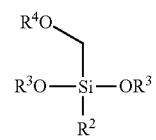

(2)

wherein each of $R^2$, $R^3$ and $R^4$ independently represents a substituted or unsubstituted alkyl group having 1 to 10 carbon atoms, or a substituted or unsubstituted aryl group having 6 to 10 carbon atoms,

[Chemical formula 6]

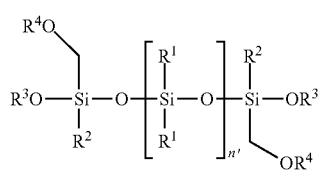

(1)"

wherein each of $R^1$, $R^2$, $R^3$ and $R^4$ independently represents a substituted or unsubstituted alkyl group having 1 to 10 carbon atoms, or a substituted or unsubstituted aryl group having 6 to 10 carbon atoms; and n' is a number of 1 to 10.

Effects of the Invention

The organopolysiloxane compound of the present invention is superior in reactivity even in the case of a hydrolysis and condensation reaction of a dealcoholization type. Further, a room-temperature-vulcanizing (RTV) organopolysiloxane composition containing such organopolysiloxane compound as a chain extender is suitable for use in applications such as a coating agent, an adhesive agent and a sealing agent, since the composition is capable of being rapidly turned into a rubber and then exhibiting a rubber elasticity due to the moisture in the air even under room temperature.

MODE FOR CARRYING OUT THE INVENTION

The present invention is described in detail hereunder.
Organopolysiloxane Compound of the Present Invention An organopolysiloxane compound of the present invention is a difunctional hydrolyzable organopolysiloxane compound represented by the following general formula (1), where the silicon atoms at both ends of the molecular chain each have one methyl group substituted by an organooxy group such as an alkoxy group (α-organooxy-substituted methyl group) and one organooxy group such as an alkoxy group (i.e. two at each end in the molecule).

[Chemical formula 7]

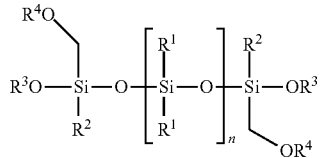

(1)

In this formula, each of $R^1$, $R^2$, $R^3$ and $R^4$ independently represents a substituted or unsubstituted alkyl group having 1 to 10 carbon atoms, or a substituted or unsubstituted aryl group having 6 to 10 carbon atoms. As for the $R^1$, $R^2$, $R^3$ and $R^4$, the alkyl group having 1 to 10 carbon atoms may be linear, cyclic or branched, specific examples of which include a linear or branched alkyl group such as a methyl group, an ethyl group, a n-propyl group, a i-propyl group, a n-butyl group, a s-butyl group, a t-butyl group, a n-pentyl group, a neopentyl group, a n-hexyl group, a n-heptyl group, a n-octyl group, a n-nonyl group and a n-decyl group; and a cycloalkyl group such as a cyclopropyl group, a cyclobutyl group, a cyclopentyl group, a cyclohexyl group, a cycloheptyl group, a cyclooctyl group and an isobornyl group. Further, specific examples of the aryl group having 6 to 10 carbon atoms include a phenyl group, a tolyl group, a xylyl group, a α-naphthyl group and a β-naphthyl group. Here, part of or all the hydrogen atoms in any of these groups may be substituted by, for example, an alkyl group, an aryl group, halogen atoms such as F, Cl and Br, or a cyano group; particularly, as $R^1$, $R^2$ and $R^3$, preferred are a methyl group, an ethyl group and phenyl group, among which a methyl group is more preferred in terms of reactivity, availability, productivity and cost. As $R^4$, a substituent group having a small number of carbon atoms is preferred, of which a methyl group is more preferred in terms of ease of synthesis.

In the general formula (1), n is a number of 0 to 10, particularly an integer of 0 to 10. In the general formula (1), especially when n is a number of 0 to 3, particularly an integer of 0 to 3, the molecular weight of the compound will be small such that if adding such compound to a room temperature-curable organopolysiloxane composition or the like, only a small amount of this compound will have to be added; it is preferred that n be a number of 0 to 3, particularly an integer of 0 to 3 (0, 1, 2 or 3).
Method for Producing Organopolysiloxane Compound of the Present Invention With regard to the organopolysiloxane compound represented by the general formula (1), when n=0 (i.e. 1,3-diorgano-1,3-diorganooxy-1,3-diorganooxymethyl-disiloxane), the compound may for example be obtained by dimerizing, via a condensation reaction performed under the presence of a catalyst such as a hydrochloric acid catalyst, a (difunctional) alkoxy group-containing hydrolyzable organosilane compound having one organooxy group such as an alkoxy group bonded to the carbon atom located in the α-position of the silicon atom, and having two silicon atom-bonded organooxy groups such as silicon atom-bonded alkoxy groups in the molecule, as represented by the following general formula (2).

[Chemical formula 8]

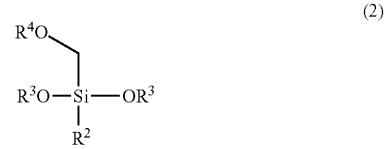

(2)

(In this formula, $R^2$, $R^3$ and $R^4$ are defined as above in the general formula (1).)

Further, with regard to the organopolysiloxane compound represented by the general formula (1), when n is a number of 1 to 10, particularly an integer of 1 to 10 (i.e. linear diorganopolysiloxane with both molecular chain ends being blocked by (organooxy) (organooxymethyl) organosilyl), the compound may for example be obtained by subjecting a diorganopolysiloxane of the following general formula (3) with both molecular chain ends being blocked by a silanol group and the organosilane compound of the general formula (2) to a condensation reaction under the presence of a catalyst such as an amine catalyst, and thus blocking both ends of the molecular chain of the diorganopolysiloxane of the following general formula (3) with both molecular chain ends being blocked by a silanol group with a residue of the organosilane compound of the general formula (2).

[Chemical fomula 9]

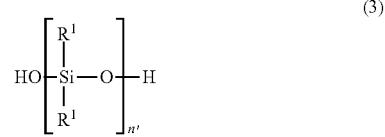

(3)

(In this formula, each $R^1$ independently represents a substituted or unsubstituted alkyl group having 1 to 10 carbon atoms, or a substituted or unsubstituted aryl group having 6 to 10 carbon atoms; n' is a number of 1 to 10, particularly an integer of 1 to 10.)
Composition Containing Organopolysiloxane Compound of the Present Invention The difunctional hydrolyzable organopolysiloxane compound of the present invention that is represented by the general formula (1) functions as a chain extender for extending the chain length of a base polymer, when added to a room temperature-curable organopolysiloxane composition containing, as a main agent (base polymer), a linear diorganopolysiloxane with both molecular chain ends being blocked by a silanol group or a hydrolyzable silyl group, particularly when added to a room-temperature-vulcanizing (RTV) organopolysiloxane composition of a dealcoholization type. Even under room temperature, a room-temperature-vulcanizing (RTV) organopolysiloxane composition containing the organopolysiloxane compound represented by the general formula (1) is capable of being turned into a silicone rubber elastic body (silicone elastomer) having both a rubber elasticity and an excellent high extensibility, by rapidly undergoing a condensation reaction due to the moisture in the air. Heating and/or humidification may also be performed at the time of crosslinking of the composition that is caused by the condensation reaction. The composition of the present invention is suitable for use in applications such as a coating agent, an adhesive agent and a sealing agent. As an object to which the coating agent, adhesive agent and sealing agent of the present invention is applied, there may be listed organic resin base materials including, for example, an epoxy resin, a phenolic resin, a polyimide resin, polycarbonate resins such as polycarbonates and polycarbonate blends, an acrylic resin such as poly(methyl methacrylate), a polyester resin such as poly(ethylene terephthalate), poly(butylene terephthalate) and an unsaturated polyester resin, a polyamide resin, an acrylonitrile-styrene copolymer resin, a styrene-acrylonitrile-butadiene copolymer resin, a polyvinyl chloride resin, a polystyrene resin, a blend of polystyrene and polyphenylene ether, cellulose acetate butyrate, and a polyethylene resin; metal base materials including an iron plate, a copper plate, a steel plate and the like; a paint coating surface, glass; ceramics; concrete; a slate board; textiles; a wood material, a stone material, tiles, inorganic fillers including (hollow) silica, titania, zirconia, alumina and the like; and glass fiber products as typified by glass fiber and also including a glass cloth, a glass tape, a glass mat, a glass paper and the like. There are no particular restrictions on the material and shape of the base material. Here, as the organopolysiloxane used as the main agent (base polymer), preferred is an organopolysiloxane having one silicon atom-bonded hydroxyl group (silanol group) or one hydrolyzable silyl group at each of the two ends of the molecular chain (two in the molecule). As such organopolysiloxane, there may be specifically employed a linear diorganopolysiloxane whose molecular ends are blocked by a hydroxyl group (diorgano hydrosilyl group) or a hydrolyzable group (hydrolyzable group-containing triorganosilyl group), as represented by the following general formula (4) or (5).

[Chemical Formula 10]

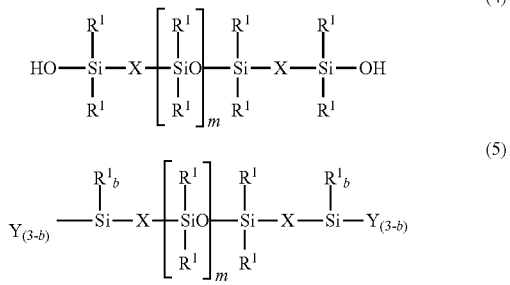

(4)

(5)

(In these formulae, $R^1$ is defined as above in the general formula (1); X represents an oxygen atom or a divalent hydrocarbon group having 1 to 8 carbon atoms; Y represents a hydrolyzable group; b is 0 or 1; m is a number with which a viscosity of this diorganopolysiloxane at 25° C. will be 100 to 1,000,000 mPa·s, normally, as an average value, m is a number of, for example, 30 to 2,000, preferably 50 to 1,200, more preferably 100 to 800.)

Here, the viscosity can be measured by a rotary viscometer (e.g. BL type, BH type, BS type, cone-plate type, rheometer). Further, the number of repetition (m) of the diorganosiloxane units $((R^1)_2SiO_{2/2})$ composing the main chain of the diorganopolysiloxane, or a polymerization degree may for example be obtained as a number average polymerization degree (or number average molecular weight) in terms of polystyrene in a gel permeation chromatography (GPC) analysis using toluene or the like as a developing solvent.

In the formulae (4) and (5), X represents an oxygen atom or a divalent hydrocarbon group having 1 to 8 carbon atoms, preferably $—(CH_2CH_2)_q—$ or $—(CH=CH)_q—$ (q is 1 to 4). Among them, particularly preferred are an oxygen atom, $—CH_2CH_2—$ or $—CH=CH—$.

In the formula (5), Y represents a hydrolyzable group, examples of which include an alkoxy group such as a methoxy group, an ethoxy group and a propoxy group; an alkoxyalkoxy group such as a methoxyethoxy group, an ethoxyethoxy group and a methoxypropoxy group; an acyloxy group such as an acetoxy group, an octanoyloxy group and a benzoyloxy group; an alkenyloxy group such as a vinyloxy group, an allyloxy group, a propenyloxy group, an isopropenyloxy group and a 1-ethyl-2-methylvinyloxy group; a ketoxime group such as a dimethylketoxime group, a methylethylketoxime group and a diethylketoxime group; an amino group such as a dimethylamino group, a diethylamino group, a butylamino group and a cyclohexylamino group; an aminoxy group such as a dimethylaminoxy group and a diethylaminoxy group; and an amide group such as a N-methylacetamide group, a N-ethylacetamide group and a N-methylbenzamide group. Among them, preferred are a methoxy group, an ethoxy group and a propoxy group.

As a specific example(s) of the organosiloxane used as the main agent (base polymer), there may be listed, for example, the following diorganosiloxanes.

[Chemical formula 11]

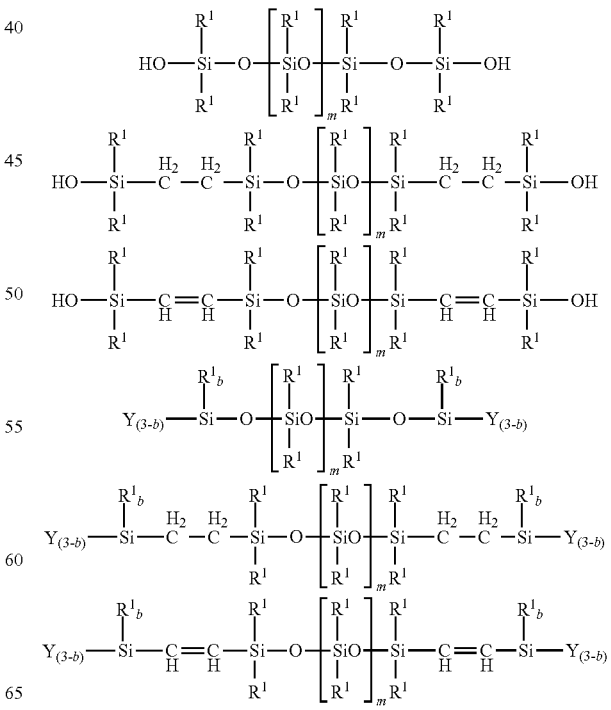

(In these formulae, $R^1$, Y, b and m are defined as above in the general formulae (4) and (5).)

One kind of these organopolysiloxanes may be used alone, or two or more kinds of them with different structures and molecular weights may be used in combination.

With the base polymer being such linear diorganopolysiloxane with both molecular chain ends being blocked by a silanol group or a hydrolyzable silyl group, when combined with the difunctional hydrolyzable organopolysiloxane compound of the present invention that is represented by the general formula (1), the chain length of the base polymer will be extended in a short period of time to achieve an increased viscosity; further, by appropriately combining one or more kinds of an optional component such as a later-described cross-linking agent, curing catalyst and/or filler when needed so as to compose the room temperature-curable organopolysiloxane composition, the composition will be easily turned into a rubber as a result of undergoing curing (crosslinking) due to the moisture in the air under room temperature, thus making it possible to obtain a silicone rubber cured product (elastomer) exhibiting a rubber elasticity.

It is preferred that the difunctional hydrolyzable organopolysiloxane compound represented by the general formula (1) be contained in the composition of the present invention by an amount of 0.1 to 10% by mass, more preferably 0.2 to 6% by mass, even more preferably 0.4 to 4% by mass. One kind of such organopolysiloxane compound may be used alone, or two or more kinds thereof may be used in combination.

In the composition of the present invention, it is preferred that the difunctional hydrolyzable organopolysiloxane compound represented by the general formula (1) be contained by an amount of 0.05 to 5 parts by mass, more preferably 0.1 to 3 parts by mass, even more preferably 0.2 to 2 parts by mass, per 100 parts by mass of the linear diorganopolysiloxane with both molecular chain ends being blocked by a silanol group or a hydrolyzable silyl group.

Further, as an optional additive(s), there may also be added a cross-linking agent, a curing catalyst and a filler, provided that the effects of the present invention will not be impaired.

As a cross-linking agent, there may also be employed an organic silicon compound other than the difunctional hydrolyzable organopolysiloxane compound represented by the general formula (1), specific examples of which include an alkoxysilane such as methyltrimethoxysilane, dimethyldimethoxysilane, vinyltrimethoxysilane, phenyltrimethoxysilane, methyltriethoxysilane and 2-ethylhexyl α-(dimethoxymethylsilyl)propionate; an isopropenoxy group-containing silane such as methyltriisopropenoxysilane, ethyltriisopropenoxysilane, vinyltriisopropenoxysilane and phenyltriisopropenoxysilane; acetoxysilane such as methyltriacetoxysilane, ethyltriacetoxysilane and vinyltriacetoxysilane; and partially hydrolyzed and condensed products of these silanes. Any one kind of them may be used alone, or two or more kinds of them may be used in combination.

The cross-linking agent is added in an amount of 0 to 30 parts by mass, preferably 0.1 to 20 parts by mass, more preferably 0.5 to 15 parts by mass, per 100 parts by mass of the linear diorganopolysiloxane with both molecular chain ends being blocked by a silanol group or a hydrolyzable silyl group.

As a curing catalyst, there are no particular restrictions imposed thereon as long as it is a curing catalyst used for curing a general moisture condensation-curable composition, specific examples of which include an alkyl tin compound such as dibutyltin oxide and dioctyltin oxide; an alkyl tin ester compound such as dibutyltin diacetate, dibutyltin dilaurate, dioctyltin dilaurate, dibutyltin dioctate, dioctyltin dioctate and dioctyltin dineodecanonate; titanate ester and titanium chelate compounds such as tetraisopropoxytitanium, tetra n-butoxytitanium, tetrakis(2-ethylhexoxy)titanium, dipropoxybis(acetylacetonato)titanium, titanium diisopropoxybis(ethylacetoacetate) and titanium isopropoxyoctylene glycol, as well as partially hydrolyzed products of these compounds; an organic metal compound such as zinc naphthenate, zinc stearate, zinc-2-ethyloctoate, iron-2-ethylhexoate, cobalt-2-ethylhexoate, manganese-2-ethylhexoate, cobalt naphthenate, aluminum trihydroxide, aluminum alcoholate, aluminum acylate, a salt of aluminum acylate, an aluminosiloxy compound and an aluminum chelate compound; an aminoalkyl group-substituted alkoxysilane such as 3-aminopropyltrimethoxysilane, 3-aminopropyltriethoxysilane, 3-aminopropylmethyldimethoxysilane, 3-aminopropylmethyldiethoxysilane, N-β(aminoethyl)γ-aminopropyltrimethoxysilane, N-β(aminoethyl)γ-aminopropyltriethoxysilane, N-β(aminoethyl)γ-aminopropylmethyldimethoxysilane, N-β(aminoethyl)γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine and N-phenyl-3-aminopropyltrimethoxysilane; amine compounds such as hexylamine, dodecylamine phosphate and tetramethylguanidine, as well as salts of these compounds; a quaternary ammonium salt such as benzyltriethylammonium acetate; a lower fatty acid salt of an alkali metal, such as potassium acetate, sodium acetate and lithium oxalate; a dialkylhydroxylamine such as dimethylhydroxylamine and diethylhydroxylamine; guanidyl group-containing silanes and siloxanes, such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane and tetramethylguanidylpropyltris(trimethylsiloxy)silane; and phosphazene base-containing silanes and siloxanes, such as N, N, N', N', N", N"-hexamethyl-N'''-[3-(trimethoxysilyl)propyl]-phosphorimidic triamide. Any one kind of them may be used alone, or two or more kinds of them may be used in combination.

Among the above examples, in terms of a more excellent reactivity, preferred are dioctyltin dilaurate, dioctyltin diversatate, tetraisopropoxytitanium, tetra n-butoxytitanium, titanium diisopropoxybis(ethylacetoacetate), 3-aminopropyltrimethoxysilane, N-β(aminoethyl)γ-aminopropyltrimethoxysilane, bis[3-(trimethoxysilyl)propyl]amine, N,N'-bis[3-(trimethoxysilyl)propyl]ethane-1,2-diamine and tetramethylguanidylpropyltrimethoxysilane; in terms of curability of the composition, more preferred are dioctyltin dilaurate, dioctyltin diversatate, 3-aminopropyltrimethoxysilane and tetramethylguanidylpropyltrimethoxysilane; in terms of achieving a low toxicity by containing no organic tin-based compounds, even more preferred are 3-aminopropyltrimethoxysilane and tetramethylguanidylpropyltrimethoxysilane; and again in terms of curability of the composition, particularly preferred is tetramethylguanidylpropyltrimethoxysilane.

There are no particular restrictions on the amount of the curing catalyst to be added; in view of improving a workability by adjusting the curing speed to an appropriate range, it is preferred that the curing catalyst be added in an amount of 0.01 to 15 parts by mass, more preferably 0.1 to 5 parts by mass, per 100 parts by mass of the linear diorganopolysiloxane with both molecular chain ends being blocked by a silanol group or a hydrolyzable silyl group.

As a filler, there may be used known fillers; for example, there are used a fine powder silica; an aerosol silica; a precipitated silica; silicas prepared by hydrophobizing the surfaces of these silicas with an organic silicon compound; glass beads; glass balloons; transparent resin beads; a silica aerogel; diatom earth; a metal oxide such as iron oxide, zinc oxide, titanium oxide and an aerosol metal oxide; a wet silica; fillers prepared by treating the surfaces thereof with silanes; a reinforcing agent such as a quartz powder, carbon black, talc, zeolite and bentonite; asbestos; a glass fiber; a carbon fiber; a metal carbonate such as calcium carbonate, magnesium carbonate and zinc carbonate; a glass wool; a fine powder mica; a molten silica powder; and a synthetic resin powder such as a polystyrene powder, a polyvinyl chloride powder and a polypropylene powder. Among these fillers, preferred are inorganic fillers such as silica, calcium carbonate and zeolite; particularly preferred are an aerosol silica with a hydrophobized surface and calcium carbonate.

It is preferred that the filler be added in an amount of 0 to 1,000 parts by mass, more preferably 1 to 1,000 parts by mass, particularly preferably 1 to 400 parts by mass, per 100 parts by mass of the linear diorganopolysiloxane with both molecular chain ends being blocked by a silanol group or a hydrolyzable silyl group.

Method for Producing the Composition of the Present Invention

The composition of the present invention can be produced by a method shown below.

For example, a mixture may be obtained by simultaneously or separately, if necessary, mixing, stirring, dissolving and/or dispersing the difunctional hydrolyzable organopolysiloxane compound represented by the general formula (1) and the linear diorganopolysiloxane with both molecular chain ends being blocked by a silanol group or a hydrolyzable silyl group. Further, depending on an intended purpose of use, an additive(s) may be added to and mixed with such mixture. As for each component, one kind thereof may be used alone, or two or more kinds thereof may be used in combination.

In the method for producing the composition, there are no particular restrictions on a device for performing mixing, stirring and dispersion. Specifically, there may be used, for example, a mixing and stirring machine manufactured by DALTON CORPORATION, or a versatile mixing and stirring machine manufactured by DALTON CORPORATION; these devices may be appropriately used in combination.

WORKING EXAMPLES

The present invention is described in greater detail hereunder with reference to working and comparative examples; the present invention shall not be limited to these working examples.

Here, in the following descriptions, Me represents a methyl group, and a viscosity is a value measured by a B-type rotary viscometer at 25° C.

[1] Synthesis of Organopolysiloxane Compound

[Working Example 1-1] Synthesis of Organopolysiloxane Compound 1

[Chemical formula 12]

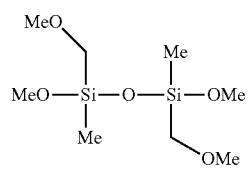

(Organopolysiloxane compound 1)

Here, 0.1 g of a 35% hydrochloric acid ($0.6 \times 10^{-3}$ mol) and 60.10 g of dimethoxy(methyl)(methoxymethyl)silane (0.4 mol) were put into a 200 mL triple-necked flask equipped with a stirrer, a reflux condenser, a dropping funnel and a thermometer, followed by heating them to 50° C. Next, 10.8 g of methanol and 3.6 g of water (0.2 mol) that had been previously mixed together were delivered thereinto by drops, and stirring was performed for three hours. The stirred product was then neutralized with propylene oxide, and was purified under a reduced pressure. The disappearance of the raw material peak(s) was confirmed by $^1$H-NMR measurement; there was obtained an organopolysiloxane compound 1 (1,3-dimethyl-1,3-dimethoxy-1,3-dimethoxymethyl-disiloxane) represented by the above structural formula.

[Working Example 1-2] Synthesis of Organopolysiloxane Compound 2

[Chemical formula 13]

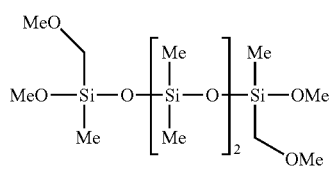

(Organopolysiloxane compound 2)

Here, 35 g of dimethoxy(methyl)(methoxymethyl)silane (0.23 mol) and 3.4 g of isopropyl amine (0.058 mol) were put into a 100 mL separable flask equipped with a stirrer, a reflux condenser, a dropping funnel and a thermometer, followed by stirring them at 80° C. Next, 7.75 g of a tetramethyldisiloxane having a hydroxyl group at both ends of the molecular chain (1,3-dihydroxy-1,1,3,3-tetramethyldisiloxane) (0.0047 mol) was delivered thereinto by drops, and stirring was performed at 80° C. for five hours. Later, the stirred product was heated to 140° C., where an excessive amount of the raw material(s) added and oligomers were eliminated via distillation under a reduced pressure and filtration under pressure. The disappearance of the silanol peak as a raw material peak was confirmed by $^{29}$Si-NMR measurement; there was obtained an organopolysiloxane compound 2 (1,7-dimethoxy-1,7-dimethoxymethyl-1,3,3,5,5,7-hexamethyltetrasiloxane) represented by the above structural formula.

[Working Example 1-3] Synthesis of Organopolysiloxane Compound 3

[Chemical formula 14]

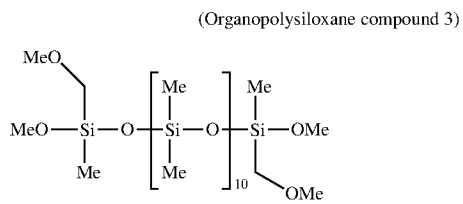

(Organopolysiloxane compound 3)

Here, 45.08 g of dimethoxy(methyl)(methoxymethyl)silane (0.3 mol) and 7.09 g of isopropyl amine (0.12 mol) were put into a 300 mL separable flask equipped with a stirrer, a reflux condenser, a dropping funnel and a thermometer, followed by stirring them at 80° C. Next, 67.82 g of a dimethyldecasiloxane having a hydroxyl group at both ends of the molecular chain (0.09 mol) was delivered thereinto by drops, and stirring was performed at 80° C. for five hours. Later, the stirred product was heated to 140° C., where an excessive amount of the raw material(s) added and oligomers were eliminated via distillation under a reduced pressure and filtration under pressure. The disappearance of the silanol peak as a raw material peak was confirmed by $^{29}$Si-NMR measurement; there was obtained an organopolysiloxane compound 3 represented by the above structural formula.

[Comparative Example 1-1] Synthesis of Organopolysiloxane Compound 4

[Chemical formula 15]

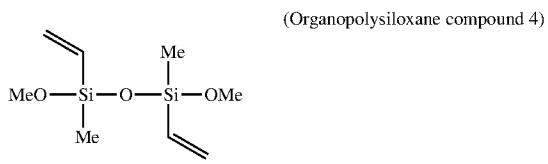

(Organopolysiloxane compound 4)

Here, 0.3 g of a 35% hydrochloric acid ($1.8 \times 10^{-3}$ mol) and 355.15 g of dimethoxy(methyl)vinylsilane (2.50 mol) were put into a 1 L separable flask equipped with a stirrer, a reflux condenser, a dropping funnel and a thermometer, followed by heating them to 50° C. Next, 67.5 g of methanol and 22.5 g of water (1.25 mol) that had been previously mixed together were delivered thereinto by drops, and stirring was performed for five hours. The stirred product was then neutralized with 0.11 g of ethylenediamine ($1.8 \times 10^{-3}$ mol), and was purified under a reduced pressure. The disappearance of the raw material peak(s) was confirmed by gas chromatography measurement; there was obtained an organopolysiloxane compound 4 (1,3-dimethyl-1,3-dimethoxy-1,3-divinyl-disiloxane) represented by the above structural formula.

[2] Observation of Reactivity of Organopolysiloxane Compound

Working Example 2-1

Here, 100 parts by mass of a α, ω-dihydroxydimethylpolysiloxane having a viscosity of 5,000 mPa·s (polymerization degree: about 400), 0.9 parts by mass of the organopolysiloxane compound 1 obtained in the working example 1-1, 0.5 parts by mass of tetramethylguanidylpropyltrimethoxysilane and 0.3 parts by mass of dioctyltin dineodecanoate were uniformly mixed by hand kneading under a moisture-blocked condition, thereby obtaining a composition.

Working Example 2-2

A composition was obtained in a similar manner as the working example 2-1, except that instead of the organopolysiloxane compound 1 obtained in the working example 1-1, there were used 1.4 parts by mass of the organopolysiloxane compound 2 obtained in the working example 1-2.

Working Example 2-3

A composition was obtained in a similar manner as the working example 2-1, except that instead of the organopolysiloxane compound 1 obtained in the working example 1-1, there were used 3.46 parts by mass of the organopolysiloxane compound 3 obtained in the working example 1-3.

Comparative Example 2-1

A composition was obtained in a similar manner as the working example 2-1, except that instead of the organopolysiloxane compound 1 obtained in the working example 1-1, there were used 0.8 parts by mass of the organopolysiloxane compound 4 obtained in the comparative example 1-1.

The compositions prepared in the working examples 2-1 to 2-3 and the comparative example 2-1 were evaluated as follows. The results thereof are shown in Table 1.

[Ratio of Increase in Viscosity]

Each composition obtained by the abovementioned preparation method(s) was stored in a tightly plugged glass bottle filled with a nitrogen gas under an atmosphere of 25° C., 50% RH. The viscosity was measured immediately after filling, after a storage period of 5 hours from filling, and then after a storage period of 24 hours from filling. Based on the viscosity measured, a ratio of increase in viscosity was calculated using the following formula. The larger the value of the ratio of increase in viscosity was, the more favorable the reactivity of the chain extender was.

[Formula 1]

$$\text{Ratio of increase in viscosity} = \frac{\text{Viscosity after being stored for 5 or 24 hours}}{\text{Viscosity immediately after filling}} \times 100(\%)$$

TABLE 1

|  |  | Working example | | | Comparative example |
|---|---|---|---|---|---|
|  |  | 2-1 | 2-2 | 2-3 | 2-1 |
| Organopolysiloxane compound |  | 1 | 2 | 3 | 4 |
| Ratio of increase in viscosity/% | 5 hours later | 17,900 | 1,200 | 600 | 200 |
|  | 24 hours later | 143,700 | 47,300 | 1,200 | 700 |

As shown in Table 1, the compositions prepared in the working examples 2-1 to 2-3 employing the organopolysiloxane compounds 1 to 3 obtained in the working examples 1-1 to 1-3, exhibited ratios of increase in viscosity that were significantly higher than those of the composition prepared in the comparative example 2-1; it became clear that the compound of the present invention had a favorable reactivity as a chain extender.

In contrast, as for the composition prepared in the comparative example 2-1, while the viscosity thereof had increased, the ratios of increase in viscosity thereof were smaller than those of the working examples 2-1 to 2-3; a sufficient reactivity failed to be secured in a short period of time.

The invention claimed is:

1. A method for producing an organopolysiloxane compound represented by the following general formula (1)', comprising:

a step of dimerizing an organosilane compound represented by the following general formula (2) via a condensation reaction performed under the presence of a catalyst,

[Chemical Formula 2]

(2)

wherein each of $R^2$, $R^3$ and $R^4$ independently represents a substituted or unsubstituted alkyl group having 1 to 10 carbon atoms, or a substituted or unsubstituted aryl group having 6 to 10 carbon atoms,

[Chemical formula 3]

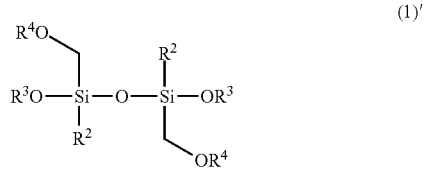

(1)' wherein each of $R^2$, $R^3$ and $R^4$ independently represents a substituted or unsubstituted alkyl group having 1 to 10 carbon atoms, or a substituted or unsubstituted aryl group having 6 to 10 carbon atoms.

* * * * *